United States Patent [19]

Kaye

[11] Patent Number: 4,878,922
[45] Date of Patent: Nov. 7, 1989

[54] FIREPLACE STARTER COMPOSITION

[75] Inventor: John A. Kaye, Parkersburg, W. Va.

[73] Assignee: A and A Realty Company, Parkersburg, Va.

[21] Appl. No.: 224,446

[22] Filed: Jul. 26, 1988

Related U.S. Application Data

[63] Continuation-in-part of Ser. No. 30,254, Mar. 24, 1987, abandoned, which is a continuation-in-part of Ser. No. 920,410, Oct. 20, 1986, abandoned.

[51] Int. Cl.$^4$ ................................................ C10L 5/00
[52] U.S. Cl. ...................................... 44/502; 44/541; 44/17
[58] Field of Search ................ 44/38, 40, 41, 17, 500, 44/502, 541

[56] References Cited

U.S. PATENT DOCUMENTS

| | | | |
|---|---|---|---|
| Re. 27,262 | 12/1971 | Schick et al. | 44/17 |
| 278,436 | 5/1883 | Koon | 44/34 |
| 439,767 | 11/1890 | White | 44/38 |
| 512,894 | 1/1984 | Noteman | 44/17 |
| 594,880 | 12/1897 | Illing | 44/17 |
| 732,979 | 7/1903 | Ward | 44/17 |
| 991,223 | 5/1911 | Mlekush | 44/17 |
| 1,124,015 | 1/1915 | Griffin | 44/40 |
| 1,183,752 | 5/1916 | Marcus | 44/38 |
| 1,308,009 | 6/1919 | Gerhardt | 44/40 |
| 1,484,302 | 2/1924 | Garrett | 44/41 |
| 1,570,585 | 1/1926 | Hoover | 44/38 |
| 1,626,965 | 5/1927 | Paulson | 44/34 |
| 1,674,163 | 6/1928 | Diederichs | 44/34 |
| 2,011,245 | 8/1935 | Horne | 44/40 |
| 2,170,326 | 8/1939 | Headland | 44/15 |
| 2,443,029 | 6/1948 | Elkan | 44/23 |
| 2,789,890 | 4/1957 | Stevens | 44/41 |
| 2,967,023 | 1/1961 | Huckabee | 44/40 |
| 3,454,377 | 7/1969 | Renwick, Jr. | 44/40 |
| 3,660,055 | 5/1972 | Haller | 44/41 |
| 3,846,086 | 11/1974 | Balch | 44/40 |
| 3,877,886 | 4/1975 | Dalzell | 44/40 |
| 3,955,937 | 5/1976 | Whang | 44/17 |
| 4,179,270 | 12/1979 | Clayton et al. | 44/40 |
| 4,417,900 | 11/1983 | Barthel | 44/40 |
| 4,485,584 | 12/1984 | Raulerson et al. | 44/14 |

FOREIGN PATENT DOCUMENTS

| | | | |
|---|---|---|---|
| 639900 | 10/1963 | Belgium | 44/17 |
| 3136 | of 1904 | United Kingdom | 44/17 |
| 397568 | 8/1933 | United Kingdom . | |
| 631868 | 11/1949 | United Kingdom . | |

*Primary Examiner*—Carl F. Dees
*Attorney, Agent, or Firm*—Jones, Tullar & Cooper

[57] ABSTRACT

An immediate slow burning granular composite for firing up fireplace logs and kindling wood. The composite is wrapped in a cellophane film and packaged in an aluminum tray to be placed beneath the grate of the fireplace. Upon lighting the composite, a constantly increasing flame ensues, which ignites the logs and kindling wood within the grate. One pound of the composite burns for approximately one hour. The composite consists of wood by-products, hydrocarbons, liquid fuel, scent producing materials, and hydrocarbon impregnated particulate ammonium nitrate.

9 Claims, No Drawings

FIREPLACE STARTER COMPOSITION

This is a continuation in part of Ser. No. 07/030,254, filed Mar. 24, 1987, which is a continuation-in-part of Ser. No. 06/920,410, filed Oct. 20, 1986 (both abandoned), entitled Fireplace Starter Composition.

BACKGROUND OF THE INVENTION

Sources for igniting and maintaining fires in fireplaces and campsites are well known in the art. However, many of these involve artificial logs or similar products or composite articles that are added directly to the fireplace wood either before or after the initial fire is commenced.

More specifically, some sources involve artificial logs of compressed wood mixed with flammable ingredients, such logs igniting when lit by a match without the use of lighter fluid. For example, Stevens, U.S. Pat. No. 2,789,890, concerns an artificial fireplace log comprised of sawdust, wood shavings or rice hulls impregnated with oil and compressed. The product is covered once by a particle retaining cover and again by an oil impervious cover. The log is ignited by applying a lit match to an edge of the outer wrapper. Dalzell, U.S. Pat. No. 3,877,886, concerns a package of fuel components, i.e. compressed wood slices and igniter, used in the place of logs for fireplaces and campsites.

Other sources involve fuel lighters for wood or coal. Headland, U.S. Pat. No. 2,170,326, concerns a source of fuel in the form of either powder or a compressed brick, comprised of dried finely ground straw and lignite coal, with sulfur, denatured alcohol and paraffin, added to wood or coal before or after fire starts for combustion. Diederichs, U.S. Pat. No. 1,674,163, concerns a fuel lighter comprised of sawdust, oil and an oxide for generating oxygen producing a product which is utilized commercially and domestically where high temperature combustion is required.

The problems with the above sources are two-fold: (1) natural fireplace logs are often preferred over artificial logs, and (2) although natural logs have problems with combustion and uniform burning, additives placed on the fire often are not very effective in maintaining an even, steady fire.

Thus, there is a need for a fire starter composition that will gradually and steadily blaze up natural fireplace logs and kindling. In this effort, the combustion and uniformity of burning of the logs and kindling wood and the resulting production of heat will be continuously reinforced by a flame emitted from the unique composition.

Accordingly, it is the primary objective of the present invention to form a composite fireplace starter with a low flash point that will burn immediately yet gradually and, placed underneath the fireplace grate, ignite and maintain a uniform blaze for the natural fireplace logs and kindling within the grate.

Other objectives of this invention provide for the fireplace starter to obtain a 30 inch flame, burn for one hour for each pound of composite material and provide fresh scents of cherry, pine or hickory.

DESCRIPTION OF THE PREFERRED EMBODIMENT

The instant invention relates to a starter composite containing the following ingredients: wood by-products, hydrocarbons, liquid fuel, scent producing material such as a mixture of scented alcohol and scented resin, and particulate ammonium nitrate impregnated with a hydrocarbon. It has been determined that this unique combination of ingredients provides superior fire starting ability. In the development of the instant fire starting composition, it has been determined that the following ingredients levels must be utilized, demonstrated in weight percent of the total composition. The wood by-products such as sawdust, fine wood chips, shavings and the like and are utilized in the range of 50% to 70%, preferably 55% to 65%, most preferably 60%. The hydrocarbons such as powdered coal dirt, coal fines and paraffin wax and are utilized in the range of 10% to 30%, preferably 15 to 25%, most preferably 20%. The liquid fuel is exemplified by mineral oil and fuel oil and makes up between 2% and 8%, preferably 5%. The scent producing material is present in an amount ranging from 5% to 20%, preferably 15% of the composition. The hydrocarbon impregnated particulate ammonium nitrate makes up 2% to 8%, preferably 5% of the fire starting composition.

The wood by-products which may be utilized include any fibrous cellulose or cellulosic material or derivatives thereof such as sawdust, fine wood chips and shavings, paper pulp, wood pulp and the like. Wood sawdust is the preferred by-product, as it generates sufficient BTU to create a comfortable working room temperature.

The solid hydrocarbons which can be employed include powdered coal dirt, coal fines and petroleum waxes such as paraffin and slack wax. The liquid fuels which can be utilized include animal, mineral and fuel oils.

Typically the scent producing material is a scented alcohol which contains an alcohol content of approximately 70% and preferably a cherry, pine, or hickory scent and/or a scented resin such as fractured ingredients. The incorporation of a scent eliminates any unpleasant odors which emanate from any of the combustible materials and pleasantly scents the room with the appropriately utilized scent. Suitable resins which can be scented include but are not limited to: synthetic resins such as polyvinyl butral, polyvinyl chloride acetate and polystyrene. Other materials which can be scented include cellulose acetate, cellulose acetate-proprionate and cellulose acetate-butrate. The scent can be supplied by certain types of perfumes such as by essential oils which are commercially available and include pine, cedar, balsam, fir, redwood, cherry, hickory, apple, lemon, citron, peach, almond, sandalwood, sassafras and the like. It has been found that a desired fragrance of the type to be obtained from the aforementioned and similar type essential oils will result from utilizing between 1 and 5 percent by weight of the essential oil in the synthetic resin or other material. The scented resin generates sufficient BTUs to establish a temperature which will ignite the wood fibers and commence combustion of the logs and kindling wood in the fireplace grate.

The particulate ammonium nitrate is impregnated with a conventional hydrocarbon, preferably a liquid hydrocarbon derived from petroleum. Suitable hydrocarbons include, but are not limited to, butane, propane, heptane, octane, benzene and naphthalene. The impregnated particulate material preferably exhibits a melting point and a flash point of between 170° C. and 185° C. It therefore remains latent during initial ignition and combustion of the composition but releases heat at a later time when the composition temperature increases to the composition's flash point. This increases the overall amount of heat generated by the composition and furthers the combustion of the fireplace logs and kindling.

The ingredients of the instant composition are blended and packaged into their final, usable form by first mixing the liquid components, namely the fuel oil and scent producing material, in a suitable vessel for approximately fifteen minutes, which is sufficient to produce a homogeneous mixture. The liquid mixture is subsequently released into a tank mixer with simultaneous addition of the remaining dry, solid ingredients. Typically the resulting granular composition is then wrapped in cellophane film or other suitable film in one-pound portions and packaged in an aluminum tray. The tray is to be placed underneath the consumer's fireplace grate. Any suitable packaging means can be employed such as the use of any supportable container for the granular composition.

Upon placing a lit match to the composite product, its low flash point produces an immediate gradual flame, which reaches 30 inches within 30 minutes and lasts approximately one hour per pound of composite. The continuous flame ignites the natural logs and kindling wood resting within the fireplace grate, ensuring a uniform and steady flame for any type or condition of fireplace wood. The continuing combustion will eventually increase the composition temperature to the melting and flash point of the impregnated ammonium nitrate which will then produce additional heat by its ignition thereby maintaining the combustion of the logs and kindling wood. The choice of scents will eliminate any odor from the liquid fuel and pleasantly scent the room.

The present invention is well adapted to carry out the objects and obtain the ends and advantages of the instant invention. While a presently preferred embodiment of the invention is given for the purpose of disclosure, changes in the composition and proportions thereof will readily suggest themselves to those skilled in the art and they are encompassed within the spirit of the invention and the scope of the following claims.

I claim:

1. A granular fire initiation composition comprising wood by-products, solid hydrocarbons, liquid fuel, and scent producing materials and particulate ammonium nitrate impregnated with a hydrocarbon.

2. The composition as defined in claim 1 wherein the wood by-products is sawdust.

3. The composition as defined in claim 1 wherein the solid hydrocarbon is coal fines.

4. The composition as defined in claim 1 wherein the liquid fuel is fuel oil.

5. The composition as defined in claim 1 wherein the scented material is a mixture scented alcohol and scented resins.

6. The composition as defined in claim 1 wherein the scent producing material has a scent of cherry, pine or hickory.

7. The composition as defined in claim 1 wherein the composition is wrapped in cellophane and packaged in an aluminum tray.

8. The composition as defined in claim 1 wherein the proportions are about:
   50% to 70% wood by-products,
   10% to 30% solid hydrocarbons,
   2% to 8% liquid fuel,
   5% to 20% scent producing material, and
   2% to 8% hydrocarbon impregnated particulate ammonium nitrate.

9. The composition as defined in claim 1 wherein the composition comprises about:
   60% wood by-products,
   20% solid hydrocarbon,
   5% liquid fuel,
   10% scent producing material, and
   5% hydrocarbon impregnated particulate ammonium nitrate.

* * * * *

UNITED STATES PATENT AND TRADEMARK OFFICE
CERTIFICATE OF CORRECTION

PATENT NO. : 4,878,922

DATED : November 7, 1989

INVENTOR(S) : John A. Kaye

It is certified that error appears in the above-identified patent and that said Letters Patent is hereby corrected as shown below:

On the cover page, the Assignee name, "A and A Realty Company", should read --A and R Realty Company--.

Signed and Sealed this

Eleventh Day of December, 1990

Attest:

HARRY F. MANBECK, JR.

*Attesting Officer*          *Commissioner of Patents and Trademarks*